United States Patent
Granel et al.

(10) Patent No.: US 12,024,081 B2
(45) Date of Patent: Jul. 2, 2024

(54) HOOKLIFT COMPRISING A HOOK POSITIONING DEVICE

(71) Applicant: GUIMA PALFINGER, Caussade (FR)

(72) Inventors: Thomas Granel, Nègrepelisse (FR); Michel Raucoules, Realville (FR)

(73) Assignee: GUIMA PALFINGER, Caussade (FR)

( * ) Notice: Subject to any disclaimer, the term of this patent is extended or adjusted under 35 U.S.C. 154(b) by 489 days.

(21) Appl. No.: 17/463,871

(22) Filed: Sep. 1, 2021

(65) Prior Publication Data

US 2022/0063476 A1 Mar. 3, 2022

(30) Foreign Application Priority Data

Sep. 2, 2020 (FR) ........................................ 2008915

(51) Int. Cl.
*B60P 1/54* (2006.01)

(52) U.S. Cl.
CPC .................................. *B60P 1/5485* (2013.01)

(58) Field of Classification Search
CPC ........ B60P 1/6463; B60P 1/6409; B60P 1/649
See application file for complete search history.

(56) References Cited

U.S. PATENT DOCUMENTS

| | | | | |
|---|---|---|---|---|
| 5,186,598 A | * | 2/1993 | Lambert | B60P 1/6463 414/498 |
| 6,669,433 B1 | * | 12/2003 | De Kock | B60P 1/6463 414/491 |
| 7,341,419 B1 | * | 3/2008 | Fink | B60P 1/6463 414/491 |
| 7,726,930 B2 | * | 6/2010 | Simpson | B60P 1/6463 414/491 |
| 9,227,546 B2 | * | 1/2016 | Marmur | B60P 1/48 |
| 10,377,292 B2 | * | 8/2019 | Downing | B60P 1/16 |
| 2013/0294874 A1 | | 11/2013 | Marmur et al. | |

FOREIGN PATENT DOCUMENTS

| | | |
|---|---|---|
| DE | 7900608 U1 | 4/1979 |
| FR | 2627441 A1 | 8/1989 |

OTHER PUBLICATIONS

French Search Report in co-pending, related French Application No. FR2008915, mailedMay 14, 2021.

\* cited by examiner

*Primary Examiner* — Kaitlin S Joerger
(74) *Attorney, Agent, or Firm* — Thomas | Horstemeyer, LLP

(57) ABSTRACT

The hooklift comprises a jib, a hook capable of being engaged in a ring of a container, and a positioning device comprising a slot and a slider capable of sliding in the slot. The hook is slidably mounted relative to the jib. The slider is capable of abutting selectively against a first end of the slot or against the second end of the slot so as to respectively prevent a sliding of the hook relative to the jib in a first sliding way beyond a first predefined position of the hook relative to the jib or in a second sliding way beyond a second predefined position of the hook relative to the jib.

14 Claims, 8 Drawing Sheets

HOOKLIFT COMPRISING A HOOK POSITIONING DEVICE

CROSS REFERENCE TO RELATED APPLICATIONS

This application claims priority to and the benefit of French Application No. FR 2008915, filed Sep. 2, 2020, which is hereby incorporated by reference herein in its entirety.

TECHNICAL FIELD

The present disclosure relates to a hooklift intended to equip a transport vehicle for the transport of movable containers.

BACKGROUND

Some transport vehicles are equipped with a hooklift that allows in particular loading and unloading of movable containers such as skips, crates or tanks.

The hooklift is an articulated beam fastened onto the frame of the vehicle. The hooklift generally comprises a jib provided at its end with a hook which is capable of being inserted into a ring of the movable container in order to be able to load the movable container on the vehicle or unload it from the vehicle.

However, there are currently different types of containers. Indeed, depending on the countries and on the existing standards, the movable containers can have different dimensions and the rings can therefore be positioned at different heights.

In order to be able to load and unload different types of containers, there are hooklifts whose hook is slidably mounted relative to the jib. In this way, it is possible to change the position of the hook relative to the jib in order to adapt the hooklift to the height of the ring of the container. A locking device, for example comprising holes and pins, allows locking the hook in position on the jib once the position of the hook has been adjusted.

However, the adjustment of the position of the hook relative to the jib is a difficult operation. Indeed, once the operator has unlocked the hook, the hook is no longer attached to the jib and it can freely slide relative to the jib. Thus, when adjusting the position of the hook, the operator must simultaneously wear the hook to hold it in the desired position, and introduce the pins into the holes in order to lock the hook on the jib. However, the hook has a significant weight, typically on the order of 35 kilograms, which makes this operation particularly difficult for a single operator.

In addition, when unlocking the hook, there is a risk that the hook falls. In order to limit accidents, it is possible to provide the hooklift with a safety chain linking the hook to the jib, so that the hook always remains attached to the jib, even after the hook has been unlocked.

However, although this solution prevents the hook from falling, it does not allow making the adjustment of the hook position easier. The operator must always wear the hook to hold it in the desired position while installing the locking device.

BRIEF SUMMARY

One aim of the present disclosure is to propose a solution that allows facilitating the adjustment of the position of the hook relative to the jib.

This aim is achieved within the framework of the present disclosure, thanks to a hooklift comprising:
a jib,
a hook capable of being engaged in a ring of a container, the hook being slidably mounted relative to the jib,
a positioning device comprising a slot and a slider, the slot being arranged in one of the hook and of the jib, and the slider being capable of being fastened onto the other of the hook and of the jib so that the slider slides in the slot when the hook slides relative to the jib, wherein the slot has a first end and a second end, the slider being capable of abutting selectively against the first end of the slot so as to prevent a sliding of the hook relative to the jib in a first sliding way beyond a first predefined position relative to the jib, and against the second end of the slot so as to prevent a sliding of the hook relative to the jib in a second sliding way beyond a second predefined position relative to the jib.

Thanks to the positioning device, it is possible to slide the hook relative to the jib until the slider abuts against the first end of the slot or against the second end of the slot, so as to position the hook either in the first predefined position or in the second predefined position.

The sliding of the hook relative to the jib in either way can be achieved under the effect of gravity, simply by orienting the hooklift, with the hook upwards or downwards.

Once the slider is abutting against either of the ends of the slot, the hook is in the desired position and the operator then only needs to lock the hook to the jib. The positioning device allows holding the hook during the locking. The operator therefore does not need to wear the hook during this operation.

The hooklift can further have the following characteristics:
one of the hook and of the jib has a first fastening hole and the other of the hook and of the jib has a second fastening hole and a third fastening hole, the first fastening hole, the second fastening hole and the third fastening hole being arranged so that:
when the hook is in the first predefined position, the first fastening hole is located opposite the second fastening hole, enabling the insertion of a fastening pin through the first fastening hole and the second fastening hole, to block the hook in the first position, and
when the hook is in the second predefined position, the first fastening hole is located opposite the third fastening hole, enabling the insertion of the fastening pin through the first fastening hole and the third fastening hole, to block the hook in the second position;
the positioning device comprises another slot arranged in one of the hook and of the jib, and the slider is capable of being fastened onto the other of the hook and of the jib, so that the slider slides in the other slot when the hook slides relative to the jib, and in which the other slot has a first end and a second end, the slider being capable of abutting selectively against the first end of the other slot so as to prevent a sliding of the hook relative to the jib in the first sliding way beyond a third predefined position of the hook relative to the jib, or against the second end of the other slot so as to prevent a sliding of the hook relative to the jib in the second sliding way beyond a fourth predefined position of the hook relative to the jib;
the third predefined position is different from the first predefined position and/or the fourth predefined position is different from the second predefined position;

the slider comprises a bracket-shaped piece comprising a first portion capable of being fastened by means of a fastening screw onto one of the hook and of the jib, and a second portion extending through either of the slots when the first portion is fastened onto one of the hook and of the jib;

one of the hook and of the jib has a fourth fastening hole, the fourth fastening hole being arranged so that when the hook is in the third predefined position, the first fastening hole, the second fastening hole or the third fastening hole is located opposite the fourth fastening hole, enabling the insertion of a fastening pin through the first fastening hole, the second fastening hole or the third fastening hole and the fourth fastening hole, to block the hook in the third position.

The present disclosure further relates to a vehicle comprising a frame and a hooklift fastened onto the frame, as defined above.

PRESENTATION OF THE DRAWINGS

Other characteristics and advantages will emerge from the following description which is purely illustrative and not limiting, and should be read in relation to the appended drawings, among which:

FIG. 6 is a detailed view of the positioning device, FIG. 7 schematically represents the hooklift when the hook is in a first position relative to the jib, FIG. 8 schematically represents the hooklift when the hook is in a second position relative to the jib, FIG. 9 schematically represents the hooklift when the hook is in a third position relative to the jib.

DETAILED DESCRIPTION OF ONE EMBODIMENT

Figure 1:
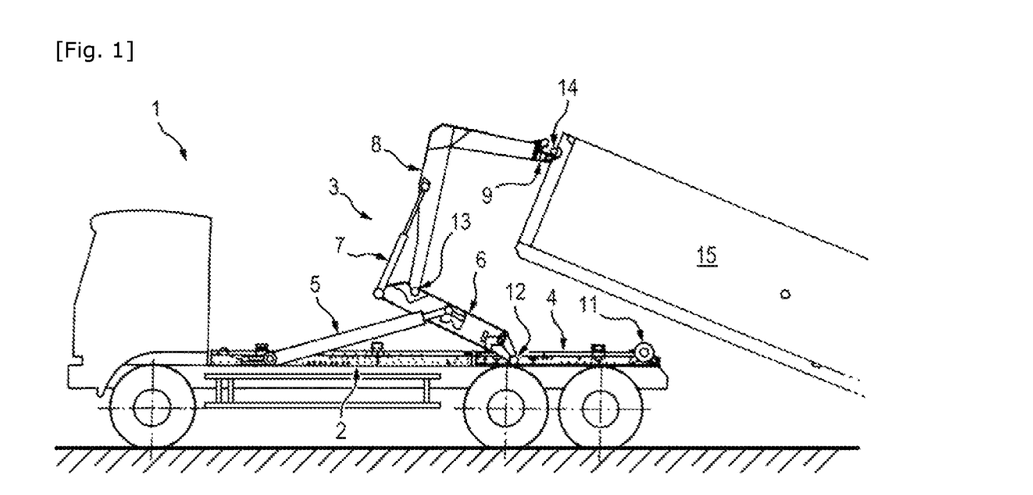
FIG. 1 schematically represents a vehicle comprising a hooklift, in the loading configuration, FIG. 2 schematically represents the vehicle comprising the hooklift in the dumping configuration, FIG. 3 schematically represents an end portion of a hooklift in accordance with one embodiment.
Figure 2:
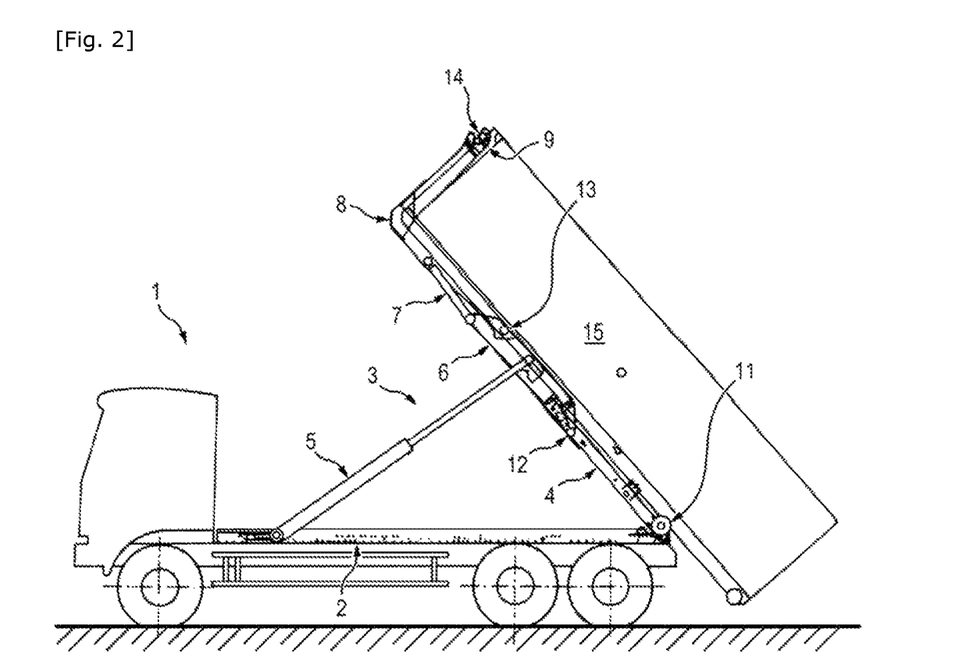

In FIGS. 1 and 2, the represented vehicle 1 comprises a frame 2 and a hooklift 3 fastened onto the frame 2.

In the example illustrated in FIGS. 1 and 2, the hooklift 3 comprises a tilter 4, a first actuator 5, a connecting rod 6, a second actuator 7, a jib 8 and a hook 9.

The tilter 4 is pivotally mounted on the frame 2 by means of a first pivot link 11.

The connecting rod 6 is pivotally mounted on the tilter 4 by means of a second pivot link 12. The first actuator 5 has one end linked to the frame 2 and another end linked to the connecting rod 6. The first actuator 5 allows controlling the rotation of the connecting rod 6 relative to the tilter 4 when the tilter 4 is locked to the frame 2 (configuration illustrated of FIG. 1) or controlling the rotation of the tilter 4 relative to the frame 2 when the connecting rod 6 is locked in position relative to the tilter 4 (configuration of FIG. 2).

The jib 8 is pivotally mounted on the connecting rod 6 by means of a third pivot link 13. The second actuator 7 allows controlling the rotation of the jib 8 relative to the connecting rod 6.

The hook 9 is capable of engaging in a ring 14 of a movable container 15 in order to be able to load the movable container 15 on the vehicle 1 and unload the movable container 15 from the vehicle 1 (FIG. 1), or in order to be able to tilt the movable container 15 to empty it (FIG. 2).

Figure 3:
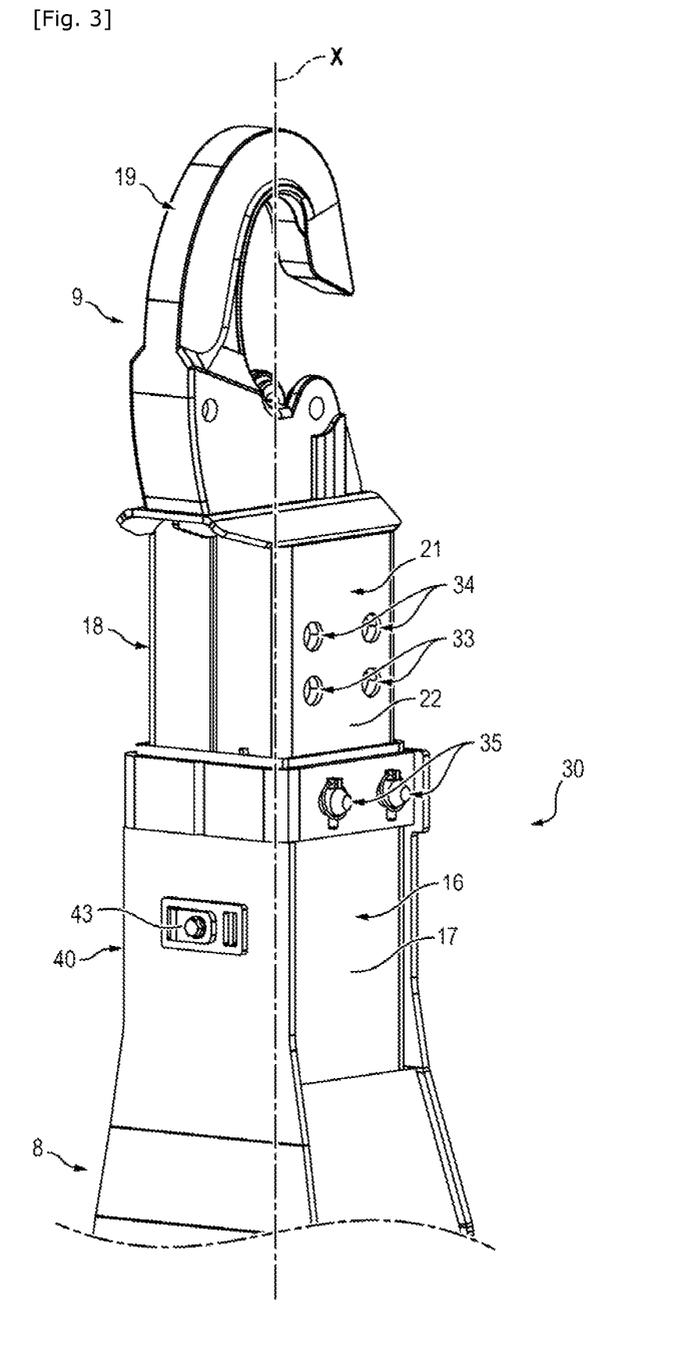

As illustrated more specifically in FIG. 3, the hook 9 is slidably mounted on the jib 8 along a longitudinal direction X, so as to be able to adjust the position of the hook 9 relative to the jib 8 depending on the type of movable container 15 to be loaded on the vehicle 1.

In the example illustrated in FIGS. 3 to 6, the jib 8 comprises a first hollow section 16 having side walls 17 delimiting an internal cavity.

The hook 9 comprises a body 18 and a curved portion 19.

The curved portion 19 is capable of engaging in a ring of a container. The body 18 is capable of being inserted into the jib 8 in order to fasten the hook 9 to the jib 8.

To this end, the body 18 may comprise a second hollow section 21 having side walls 22. The second section 21 is capable of being inserted into the first hollow section 16 of the jib along the longitudinal sliding direction X. The sections 16 and 21 are dimensioned such that the second section 21 fits into the first section 16, while being able to slide relative to the first section 16. In other words, the hook 9 and the jib 8 form a telescopic system.

As illustrated in FIGS. 3 to 6, the beam 3 also comprises a locking device 30 that allows locking the hook 9 in a fixed position relative to the jib 8.

More specifically, in the example illustrated in the figures, the locking device 30 allows locking the hook 9 relative to the jib 8 selectively in three distinct predefined positions. However, it would be possible to design a locking device 30 that allows locking the hook 9 selectively in two distinct positions only, or in a number of distinct positions greater than three.

To this end, the locking device 30 comprises on the one hand first fastening holes 31 arranged in the jib 8, and on the other hand second fastening holes 32, third fastening holes 33 and fourth fastening holes 34 arranged in the hook 9. The locking device 30 further comprises fastening pins 35 and blocking pins 36.

The first fastening holes 31 are for example circular holes. In the example illustrated in the figures, the first fastening holes 31 are four in number. The first fastening holes 31 are arranged in pairs in opposite side walls 17 of the first section 16. The first fastening holes 31 each have an axis extending along a direction transverse, that is to say orthogonal, to the longitudinal sliding direction X.

In the example illustrated in the figures, the second fastening holes 32, the third fastening holes 33 and the fourth fastening holes 34 are also circular holes. In the example illustrated in the figures, the second fastening holes 32 are four in number, the third fastening holes 33 are four in number and the fourth fastening holes 34 are four in number. The second fastening holes 32, the third fastening holes 33 and the fourth fastening holes 34 are arranged in pairs in opposite side walls 22 of the second section 21. The second fastening holes 32, the third fastening holes 33 and the fourth fastening holes 34 each have an axis extending along a direction transverse, that is to say orthogonal, to the longitudinal sliding direction X.

The second fastening holes 32, the third fastening holes 33 and the fourth fastening holes 34 are arranged in positions different from each other (or at different heights) along the longitudinal sliding axis X.

When the hook 9 is in a first predefined position relative to the jib 8 (first position illustrated in FIG. 7), the second fastening holes 32 are located opposite the first fastening holes 31. In other words, the first fastening holes 31 coincide with the second fastening holes 32. In this position, the fastening pins 35 can be inserted into both the first fastening holes 31 and the second fastening holes 32 in order to block the hook 9 in the first position relative to the jib 8.

In the example illustrated in the figures, the locking device comprises two fastening pins 35.

Figure 7:
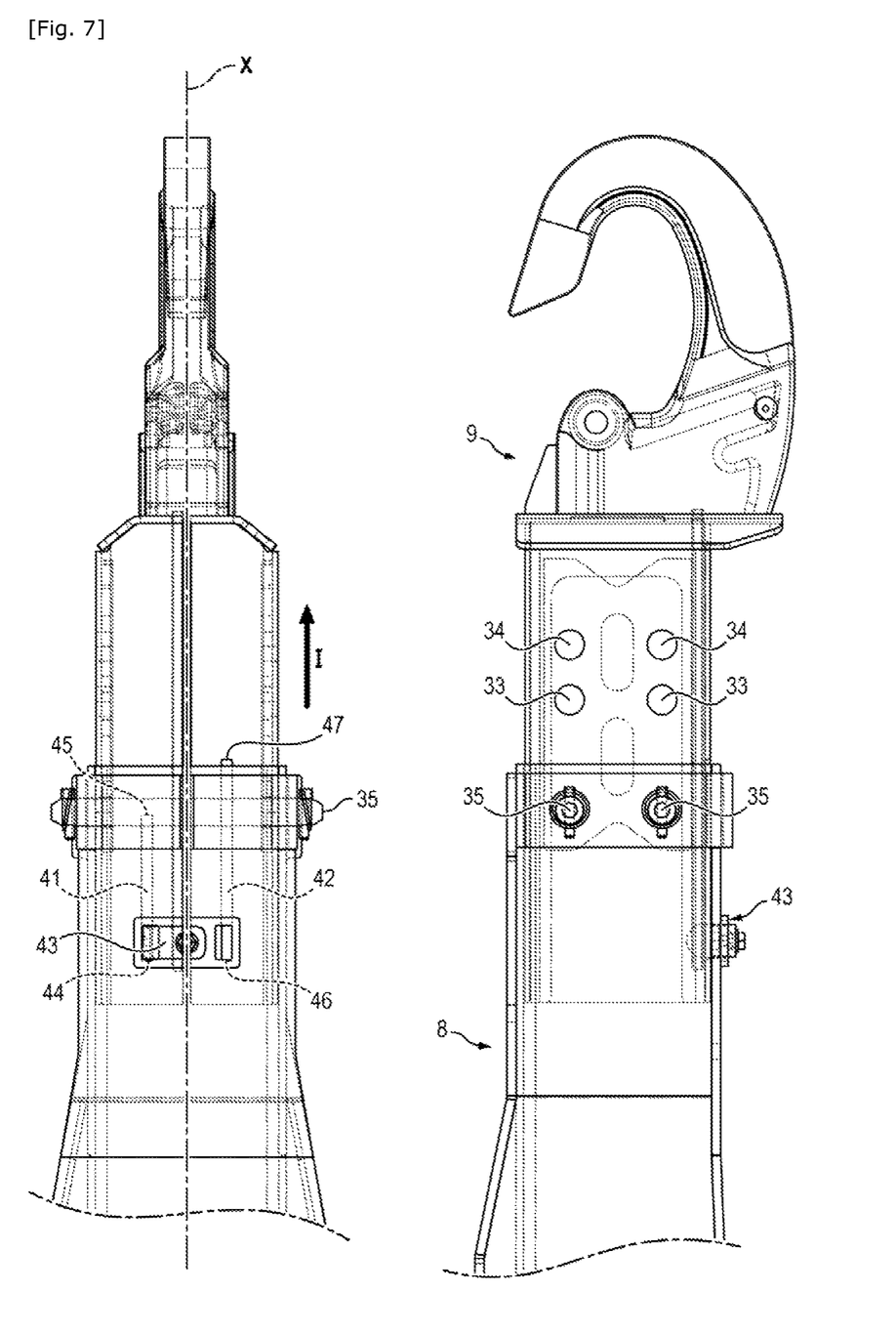

When the hook 9 is in the first position illustrated in FIG. 7, each fastening pin 35 is inserted through two first fastening holes 31 of the jib 8 and two second fastening holes 32 of the hook 9.

In this way, the fastening pins 35 immobilize the hook 9 relative to the jib 8 in the first position, while preventing the sliding of the hook 9 relative to the jib 8.

When the hook 9 is in a second predefined position relative to the jib 8 (second position illustrated in FIG. 8), the third fastening holes 33 are located opposite the first fastening holes 31. In other words, the first fastening holes 31 coincide with the third fastening holes 33. The fastening pins 35 can be inserted into both the first fastening holes 31 and the third fastening holes 33 in order to block the hook 9 in the second position relative to the jib 8.

Figure 6:
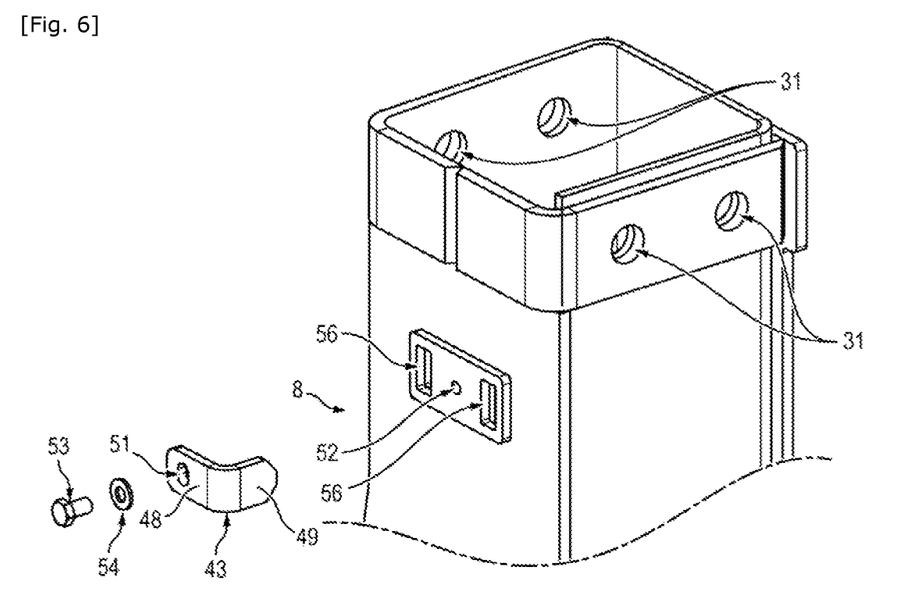

When the hook 9 is in the second position illustrated in FIG. 6, each fastening pin 35 is inserted through two first fastening holes 31 of the jib 8 and two third holes of the hook 9.

In this way, the fastening pins 35 immobilize the hook 9 relative to the jib 8 in the second position, while preventing the sliding of the hook 9 relative to the jib 8.

When the hook 9 is in a third predefined position relative to the jib 8 (third position illustrated in FIG. 8), the fourth fastening holes 34 are located opposite the first fastening holes 31. In other words, the first fastening holes 31 coincide with the fourth fastening holes 34. The fastening pins 35 can be inserted into both the first fastening holes 31 and the fourth fastening holes 34 in order to block the hook 9 in the third position relative to the jib 8.

When the hook 9 is in the third position illustrated in FIG. 7, each fastening pin 35 is inserted through two first fastening holes 31 of the jib 8 and two fourth fastening holes 34 of the hook 8.

In this way, the pins fastening 35 immobilize the hook 9 relative to the jib 8 in the third position, by preventing the sliding of the hook 9 relative to the jib 8.

Each fastening pin 35 has a transverse hole in the vicinity of each of its ends. Each transverse hole is provided to receive a blocking slug 36.

In the example illustrated in the figures, the locking device comprises four blocking pins 36, that is to say two blocking pins 36 per fastening pin 35.

Figure 4:
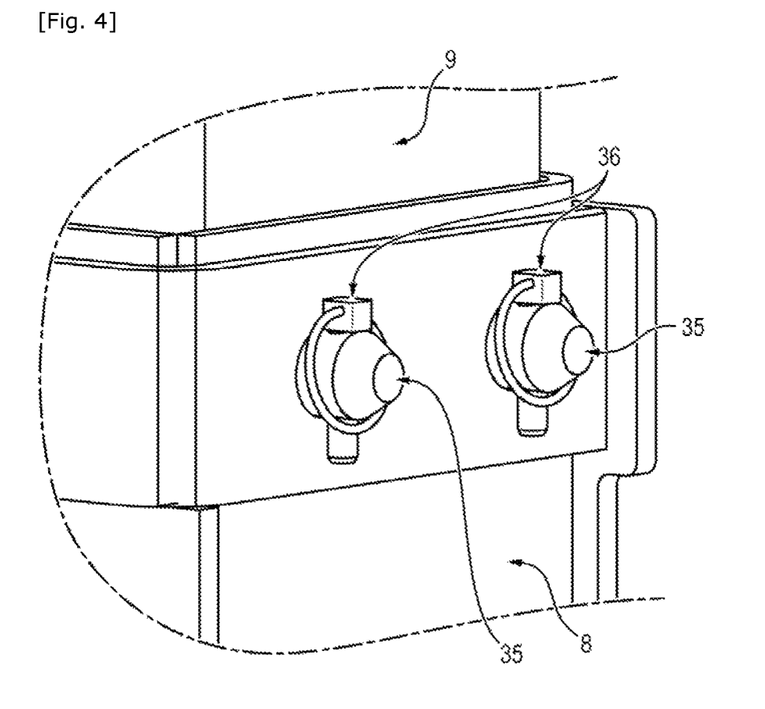
FIG. 4 is a detail view of the locking device, FIG. 5 schematically represents, in an exploded view, the end portion of the hooklift of FIG. 3.

As illustrated in FIG. 4, once inserted into the holes of the fastening pins 35, the blocking pins 36 prevent the fastening pins 35 from coming out of the holes of the jib 8 and of the hook 9. The blocking pins 36 prevent unintentional unlocking of the hook 9.

Figure 5:
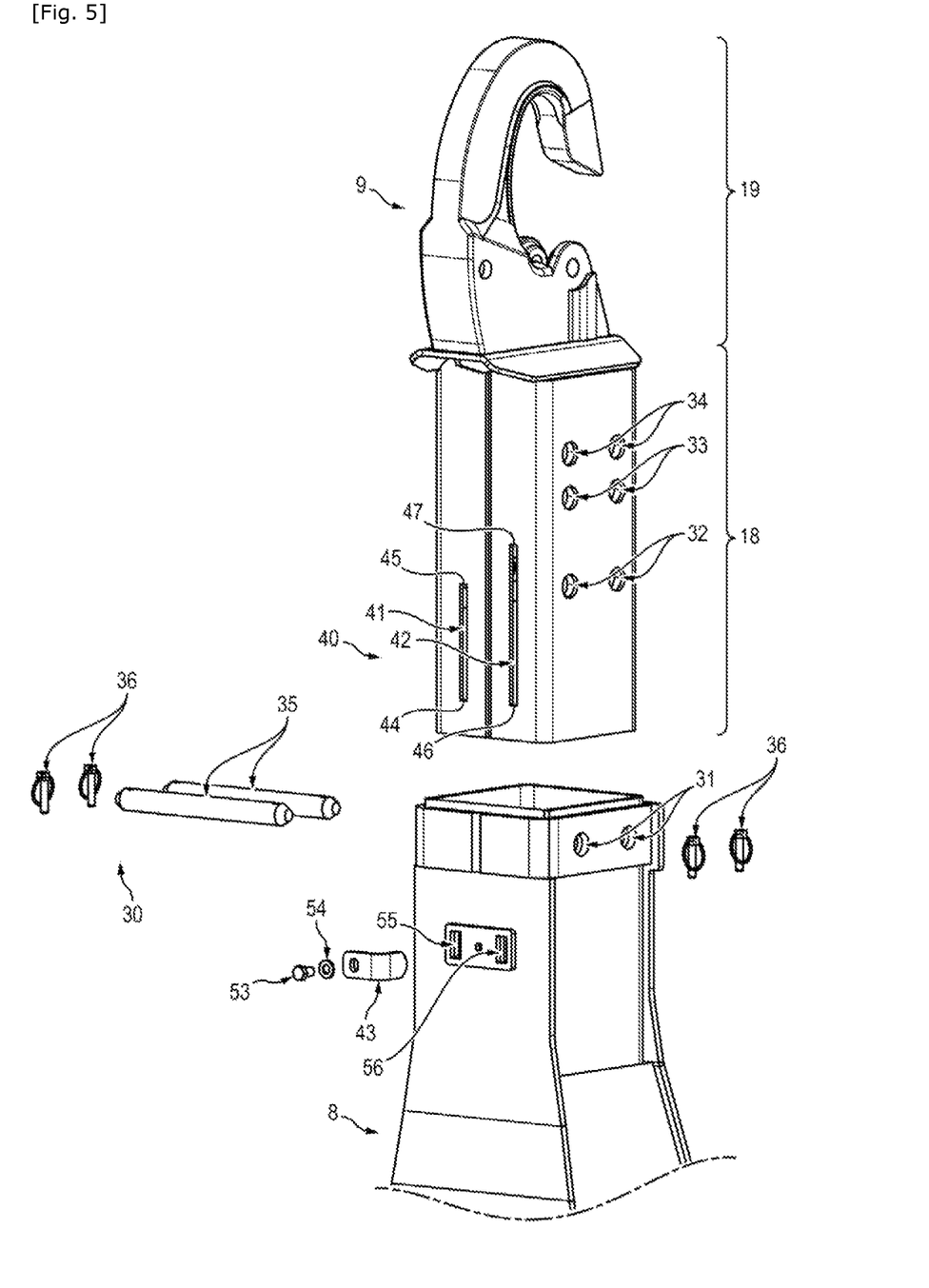

Moreover, as illustrated in FIGS. 5 and 6, the hooklift 3 also comprises a positioning device 40 for correctly positioning the hook 9 relative to the jib 8 in order to facilitate the locking of the hook 9 on the jib 8.

In the example illustrated in FIGS. 4 and 5, the positioning device 40 comprises several slots 41, 42 and a slider 43.

The slots 41 and 42 are separate from the fastening holes 32 to 34.

The slider 43 is separate from the fastening pins 35.

More specifically, the positioning device 40 comprises a first slot 41 and a second slot 42. However, it would be possible to design a positioning device 40 comprising a single slot or comprising a number of slots greater than two.

In the example illustrated in FIGS. 4 and 5, the slots 41 and 42 are arranged in a side wall 22 of the second section 21, separate from the side walls 22 in which the fastening holes 32 to 34 are arranged. More specifically, the slots 41 and 42 are arranged in a side wall 22 of the second section 21, extending transversely relative to the side walls 22 in which the fastening holes 32 to 34 are arranged. The slots 41 and 42 are rectilinear. The slots 41 and 42 are disposed side by side. The slots 41 and 42 are mutually parallel. Each slot 41, 42 extends parallel to the longitudinal sliding direction X.

The first slot 41 has a first end 44, and a second end 45, opposite to the first end 44.

Likewise, the second slot 42 has a first end 46 and a second end 47, opposite to the first end 46.

In this example, the first slot 41 and the second slot 42 have different lengths, so that their second ends 45 and 47 are at different heights along the longitudinal axis X. On the other hand, their first ends 44 and 46 are at identical heights along the longitudinal axis X. However, it would be possible to design a positioning device 40 in which the first ends of the slots are at different heights along the longitudinal axis X, in order to increase the number of predefined positions of the hook 9 relative to the jib 8.

The slider 43 is capable of being fastened onto the jib 8.

More specifically, in the example illustrated in FIGS. 5 and 6, the slider 43 is capable of being fastened onto a side wall 17 of the first section 16 of the jib 8.

In the example illustrated in FIGS. 5 and 6, the slider 43 is a bracket-shaped or L-shaped piece. The slider 43 comprises a first tab 48 capable of being fastened onto the side wall 17 of the section 16 and a second tab 49 extending perpendicularly to the first tab 48, and capable of being inserted as desired into either of the slots 41 and 42.

The first tab 48 of the slider 43 has a fastening hole 51 and the side wall 17 of the section 16 has a fastening hole 52. The positioning device 40 comprises a screw 53 and a washer 54. The screw 53 is capable of being inserted into the fastening holes 51 and 52 to fasten the slider 43 onto the side wall 17 of the section 16 of the jib 8.

In addition, the side wall 17 of the section 16 of the jib 8 has a first opening 55 and a second opening 56. The first opening 55 is arranged to allow the insertion of the second tab 49 of the slider 43 through the side wall 17 of the section 16 into the first slot 41. The second opening 56 is arranged to allow the insertion of the second tab 49 of the slider 43 through the side wall 17 of the section 16 into the second slot 42.

Thus, it is possible to fasten the slider 43 onto the jib 8 so that the slider 43 is selectively received in the first slot 41 or in the second slot 42, as required. To this end, it suffices to position the slider, either in a first position, in which the second tab 49 extends through the first opening 55, or in a second position, in which the second tab 49 extends through the second opening 56. To switch from the first position to the second position, the slider 43 is simply rotated by 180 degrees relative to the axis of the hole 51.

Once the slider 43 is fastened onto the jib 8, in the desired position, the slider 43 slides in either of the slots 41, 42 when the hook 9 slides relative to the jib 9.

Figure 8:
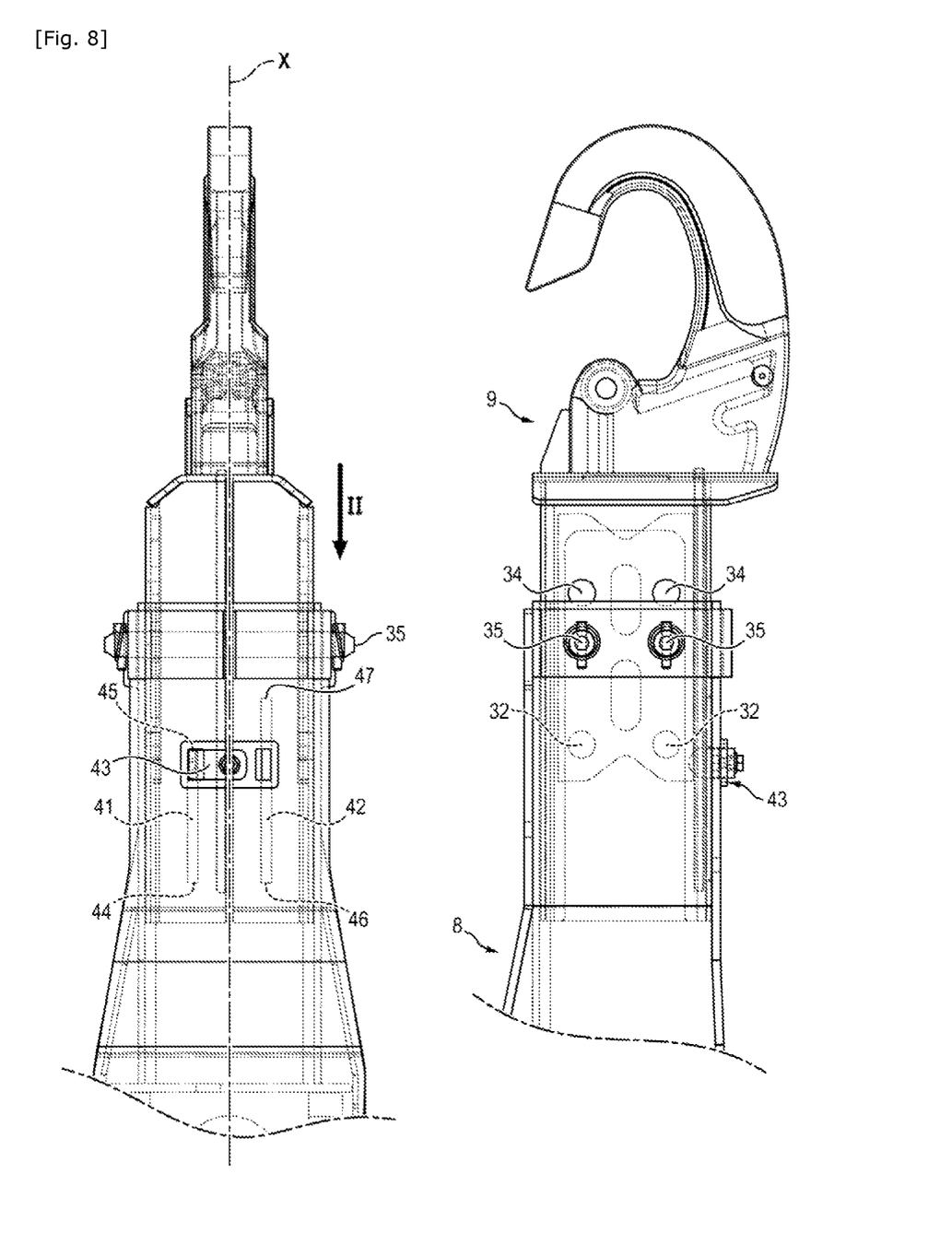

In FIGS. 3, 7 and 8, the slider 43 is fastened onto the jib 8 so that it extends through the first slot 41.

In this configuration, the slider 43 is able to slide in the first slot 41 when the hook 9 slides relative to the jib 8 parallel to the longitudinal sliding direction X.

During its displacement in the first slot 41, the slider 43 is capable of abutting selectively against the first end 44 of the first slot 41, as illustrated in FIG. 7, or against the second end 45 of the first slot 41, as illustrated in FIG. 8.

When the slider 43 is in abutment against the first end 44 of the first slot 41 (FIG. 7), the slider 43 prevents a sliding of the hook 9 relative to the jib 9 in a first sliding way (arrow I) beyond the first predefined position relative to the jib 8. The first sliding way is the sliding way of the slider when the latter travels through the first slot 41 from the second end 45 to the first end 44 of the first slot 41.

When the slider 43 is in abutment against the second end 45 of the first slot 41 (FIG. 8), the slider 43 prevents a sliding of the hook 9 relative to the jib 9 in a second sliding way (arrow II) beyond the second predefined position relative to the jib. The second sliding way is the sliding way of the slider when the latter travels through the first slot 41 from the first end 44 to the second end 45 of the first slot 41. In other words, the second sliding way is opposite to the first sliding way.

Figure 9:
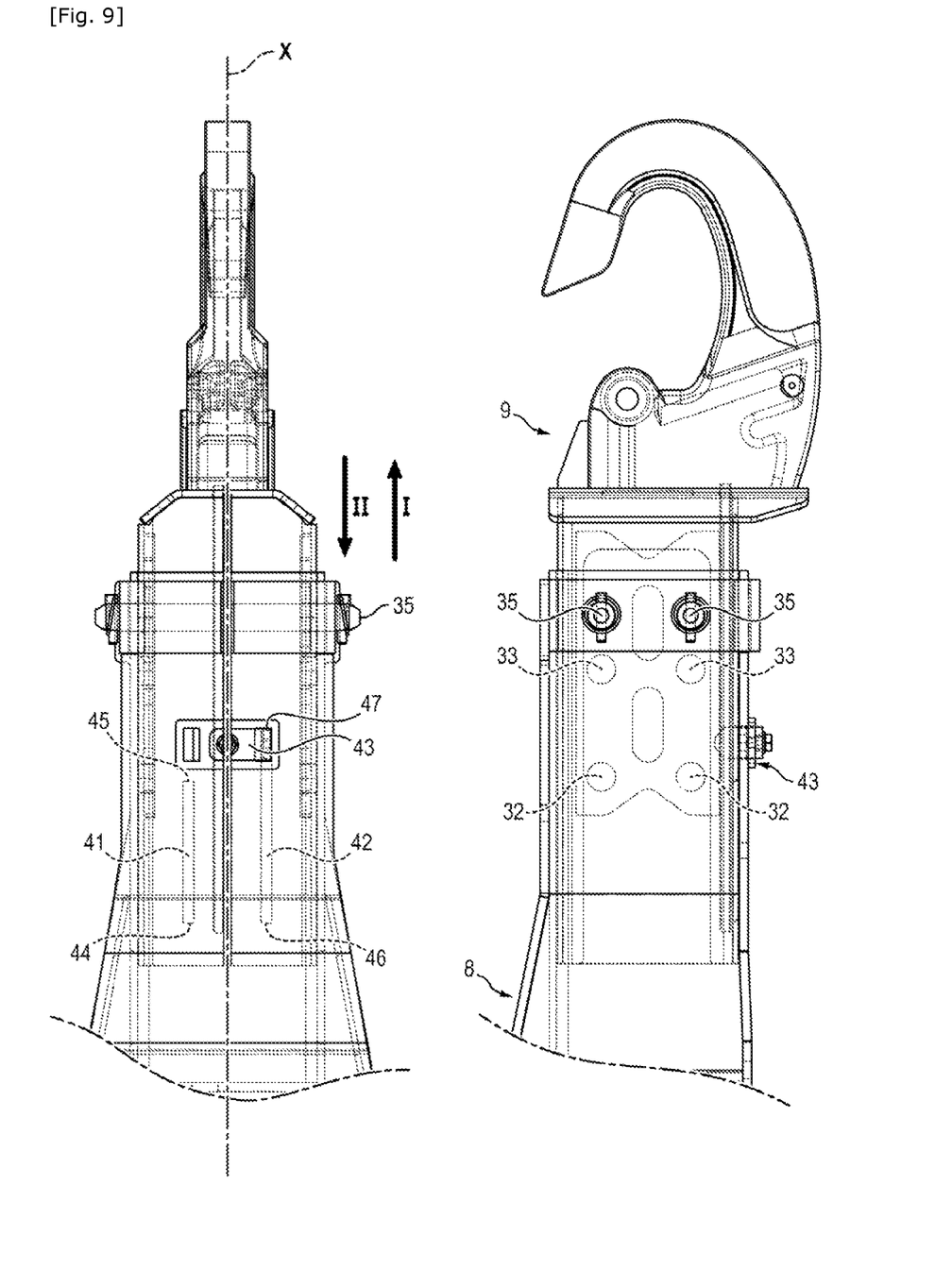

In FIG. 9, the slider 43 is fastened onto the jib 8 so that it extends through the second slot 42.

In this configuration, the slider 43 is able to slide in the second slot 42 when the hook 9 slides relative to the jib 8 parallel to the longitudinal sliding direction X.

The slider 43 is capable of abutting selectively against the first end 46 of the second slot 42, or against the second end 47 of the second slot 42, as illustrated in FIG. 9.

When the slider 43 is in abutment against the first end 46 of the second slot 42, the slider 43 prevents a sliding of the hook 9 relative to the jib 8 in the first sliding way (arrow I) beyond the first predefined position relative to the jib 8.

When the slider 43 is in abutment against the second end 47 of the second slot 42 (FIG. 9), the slider 43 prevents a sliding of the hook 9 relative to the jib 8 in the second sliding way (arrow II) beyond the third predefined position relative to the jib 8.

In use, when the hook 9 is in the first position, as illustrated in FIG. 7, and when an operator wishes to change the position of the hook 9 so that the hook 9 is in the second position, as illustrated in FIG. 8, the operator proceeds according to the following steps.

According to a first step, the operator controls the hooklift 3 so as to orient the hook 9 upwards (that is to say the arched portion 19 of the hook 9 is located above the body 18 of the hook 9 relative to the vertical).

According to a second step, the operator unlocks the hook 9. To this end, the operator removes the blocking pins 36 from the fastening pins 35 then he removes the fastening pins 35 from the fastening holes 31, 32.

Under the effect of gravity, the hook 9 slides relative to the jib 8 along the longitudinal direction X, in the second way (arrow II).

Simultaneously, the slider 43 slides in the first slot 41 until the slider 43 abuts against the second end 45 of the first slot 41. When the slider 43 is in abutment against the second end 45, the hook 9 is in the second position and the slider 43 prevents the sliding of the hook 9 relative to the jib 8 beyond the second position.

At this moment, the first fastening holes 31 are located opposite the third fastening holes 33.

According to a third step, the operator locks the hook 9 in the jib 8. To this end, the operator introduces the fastening pins 35 into the first fastening holes 31 and into the third fastening holes 33. Then, he introduces the pins 36 into the holes of the fastening pins 35.

The hook 9 is thus locked in the second position relative to the jib 8.

Conversely, when the hook 9 is in the second position, as illustrated in FIG. 8, and when an operator wishes to change the position of the hook 9 so that the hook 9 is in the first position, as illustrated in FIG. 7, the operator proceeds according to the following steps.

According to a first step, the operator controls the hooklift 3 so as to orient the hook 9 downwards (that is to say the arched portion 19 of the hook 9 is located below the body 18 of the hook 9 relative to the vertical).

According to a second step, the operator unlocks the hook 9. To this end, the operator removes the blocking pins 36 from the fastening pins 35 then he removes the fastening pins 35 from the fastening holes 31, 33.

Under the effect of gravity, the hook 9 slides relative to the jib 8 along the longitudinal direction X, in the first way (arrow I).

Simultaneously, the slider 43 slides in the first slot 41 until the slider 43 abuts against the first end 44 of the first slot 41. When the slider 43 is in abutment against the first end 44, the hook 9 is located in the first position and the slider 43 prevents the sliding of the hook 9 relative to the jib 8 beyond the first position.

At this moment, the first fastening holes 31 are located opposite the second fastening holes 32.

According to a third step, the operator locks the hook 9 in the jib 8. To this end, the operator introduces the fastening pins 35 into the first fastening holes 31 and into the second fastening holes 32. Then, he introduces the blocking pins 36 into the holes of the fastening pins 35.

The hook 9 is thus locked in the first position.

The same steps can be executed when the slider 43 is in the second slot 42. In this case, the preceding steps allow the operator to switch the hook 9 from the first position to the third position, as illustrated in FIG. 9, and vice versa.

The invention claimed is:

1. A hooklift comprising:
   a jib,
   a hook configured to engage with a ring of a container, the hook slidably mounted relative to the jib, and
   a positioning device comprising a first slot and a slider, the first slot arranged in one of either the hook or the jib, and the slider fastened onto the other of the hook or the jib so that the slider slides in the first slot when the hook slides relative to the jib, wherein the first slot has a first end and a second end, the slider configured to selectively abut against the first end of the first slot so as to prevent a sliding of the hook relative to the jib in a first sliding way beyond a first predefined position of the hook relative to the jib and abut against the second end of the first slot so as to prevent a sliding of the hook relative to the jib in a second sliding way beyond a second predefined position of the hook relative to the jib, and
   wherein the positioning device further comprises a second slot, the second slot arranged in either of the hook or the jib with the first slot.

2. The hooklift according to claim 1, wherein one of the hook or the jib has a first fastening hole and the other of the hook and the jib has a second fastening hole and a third fastening hole, the first fastening hole, the second fastening hole and the third fastening hole arranged so that:
   when the hook is in the first predefined position, the first fastening hole is located opposite the second fastening hole enabling the insertion of a fastening pin through the first fastening hole and the second fastening hole, to fix the hook in the first position, and when the hook is in the second predefined position, the first fastening hole is located opposite the third fastening hole, enabling the insertion of the fastening pin through the first fastening hole and the third fastening hole to fix the hook in the second position.

3. The hooklift according to claim 1, wherein the slider configured to be fastened onto the other of the hook or the jib, so that the slider slides in the second slot when the hook slides relative to the jib, and wherein the second slot has a first end and a second end, the slider configured to selectively abut against the first end of the second slot so as to prevent a sliding of the hook relative to the jib in the first sliding way beyond a third predefined position of the hook relative to the jib, or against the second end of the second slot so as to prevent a sliding of the hook relative to the jib in the second sliding way beyond a fourth predefined position of the hook relative to the jib.

4. The hooklift according to claim 3, wherein the third predefined position is different from the first predefined position and/or the fourth predefined position is different from the second predefined position.

5. The hooklift according to claim 3, wherein the slider comprises a bracket-shaped piece comprising a first portion configured to be fastened by means of a fastening screw onto one of the hook or the jib, and a second portion extending through either of the first slot or the second slot when the first portion is fastened onto one of the hook or the jib.

6. The hooklift according to claim 2, wherein one of the hook or the jib has a fourth fastening hole, the fourth fastening hole arranged so that when the hook is in the third predefined position, the first fastening hole, the second fastening hole or the third fastening hole is located opposite the fourth fastening hole, enabling the insertion of a fastening pin through the first fastening hole, the second fastening hole or the third fastening hole and the fourth fastening hole, to block the hook in the third position.

7. A vehicle comprising a frame and the hooklift according to claim 1 fastened onto the frame.

8. The hooklift according to claim 1, wherein the second slot has a first end and a second end, the second end of the first slot and the second end of the second slot located at different heights along a longitudinal axis of either the hook or the jib in which the first slot and the second slot are arranged.

9. The hooklift according to claim 1, wherein the first slot and the second slot have different lengths.

10. The hooklift according to claim 1, wherein the slider is selectively receivable in either the first slot or the second slot.

11. The hooklift according to claim 1, wherein the hook comprises a first fastening hole and the jib comprises a second fastening hole, the first and second fastening holes arranged such that when the hook is in the first predefined position, the first fastening hole is located opposite the second fastening hole, and further comprising a pin configured to be received through the first fastening hole and the second fastening hole.

12. The hooklift according to claim 11, wherein the hook comprises a third fastening hole, the third fastening hole and the second fastening hole arranged such that, when the hook is in the second predefined position, the first fastening hole is located opposite the third fastening hole, and the pin is configured to be received in the first fastening hole and the third fastening hole.

13. The hooklift according to claim 1, wherein the jib comprises a first fastening hole and the hook comprises a second fastening hole, the first and second fastening holes arranged such that when the hook is in the first predefined position, the first fastening hole is located opposite the second fastening hole, and further comprising a pin configured to be received through the first fastening hole and the second fastening hole.

14. The hooklift according to claim 13, wherein the jib comprises a third fastening hole, the third fastening hole and the second fastening hold arranged such that, when the hook is in the second predefined position, the first fastening hole is located opposite the third fastening hole, and the pin is configured to be received in the first fastening hole and the third fastening hole.

* * * * *